United States Patent
Urquhart

[11] 3,797,944
[45] Mar. 19, 1974

[54] NON-DESTRUCTIVE TESTING OF ACOUSTICAL HONEYCOMB PANELS

[75] Inventor: George R. Urquhart, South Laguna, Calif.

[73] Assignee: Rohr Industries, Inc., Chula Vista, Calif.

[22] Filed: Nov. 8, 1972

[21] Appl. No.: 304,625

[52] U.S. Cl. ............................. 356/237, 350/3.5
[51] Int. Cl. ..................... G01n 21/00, G01n 29/04
[58] Field of Search ............... 350/3.5; 256/237; 181/33 G, 33 H, 33 B

[56] References Cited
UNITED STATES PATENTS
3,548,643  12/1970  Leith et al. .................... 350/3.5 X
3,645,129  2/1972   Grant ............................. 350/3.5 X

*Primary Examiner*—Ronald L. Wibert
*Assistant Examiner*—Paul K. Godwin

[57] ABSTRACT

A time average holographic transparency photograph is made of the imperforate surface of acoustical honeycomb panel having a plurality of cells while the perforate surface is subjected to sound energy having a known frequency equal to the designed resonant frequency of the panel cells, and at a selected energy level. The transparency is then viewed while the laser beam is directed therethrough. Light swirls in the transparency indicate good cells, and dark areas indicate inoperative or faulty cells. Where unknown, the fundamental resonant frequency of the cells can be determined by making a real time image of the imperforate surface absent the sound excitation. The imperforate sheet is then viewed through the resulting real time image transparency while subjecting the perforate surface to a slowly varying range of sonic frequencies at a constant energy level until the swirls of resonance are displayed.

2 Claims, 1 Drawing Figure

PATENTED MAR 19 1974
3,797,944
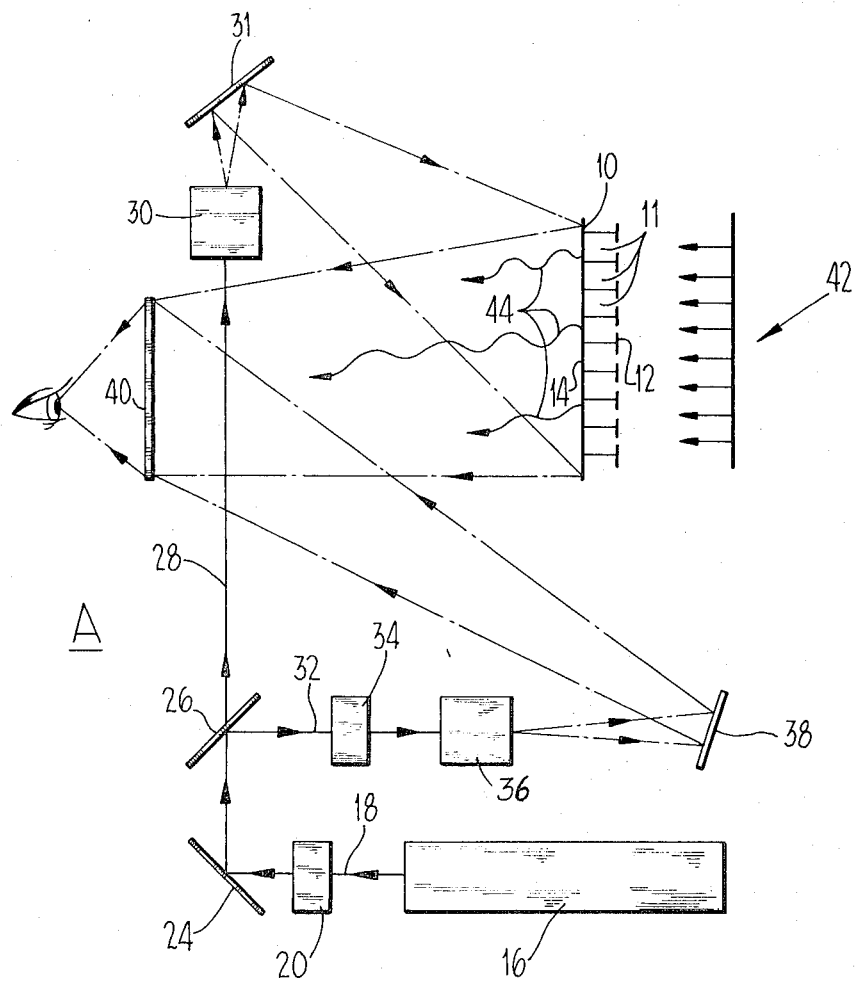

NON-DESTRUCTIVE TESTING OF ACOUSTICAL HONEYCOMB PANELS

BACKGROUND OF THE INVENTION

There is presently no completely satisfactory method of non-destructive testing of acoustical honeycomb panel. One method employed is to measure the physical size of a sampling of the core cells prior to installation of the imperforate facing sheet and by mathematical computations determine the approximate resonant frequency of the sampled cells. Another method is to acoustically excite the perforated surface of the material with sonic energy of known frequency and intensity, record the intensity at the non-perforated surface of the material and, by mathematical computations, approximate the loss due to absorption by the material. Both of the described methods are time consuming and have a varying unknown degree of accuracy. In addition, there is no prior method available to accurately determine the percentage and location of non-resonant cells for a given sample of material, or to isolate specific individual non-resonant cells.

The present invention provides a testing method which accurately and quickly pinpoints non-resonant or malfunctioning cells and, in addition, provides for field testing of acoustical honeycomb material under environmental conditions.

SUMMARY OF THE INVENTION

The present invention relates to improvements in halographic analyzers and, more particularly, to a holographic non-destructive testing method for checking the acoustical qualities of cell structure within acoustical honeycomb panel material by checking resonance of the cells and to a method of determining the resonant frequency of cell structure when such resonant frequency is unknown.

BRIEF DESCRIPTION OF THE DRAWINGS

These advantages of the invention will become clear from the following detailed description when read in conjunction with the accompanying drawing.

The single FIGURE of the drawing is a basic block diagram showing an illustrative apparatus for practicing the invention.

DETAILED DESCRIPTION OF THE DRAWINGS

A testing apparatus, generally shown as A, for practicing the present invention is shown diagramatically in the single FIGURE of the drawing for ease of illustration. A test specimen 10 is illustrated as a section of acoustical honeycomb panel material with usual honeycomb core 11 having a plurality of cells, a perforated facing sheet 12 and an imperforate facing sheet 14.

The imperforate sheet 14 is illuminated with coherent light from a conventional laser source 16, from which a laser beam 18 first passes through a control shutter 20. This shutter enables the beam to be varied in intensity as required to compensate for changes in environmental lighting conditions. The beam is then reflected at a convenient angle by a reflective surface 24, and is then passed through a conventional beam splitter 26. One beam 28, herein referred to as the object beam, continues on a straight path to a conventional spreading lens and pin hole assembly 30, herein referred to as a spatial filter, and continues thence as a diverging cone of laser light which is reflected by a second reflector 31 to illuminate the imperforate surface 14 of test specimen 10.

A second beam 32, herein referred to as the reference beam, leaves the beam splitter 26 at right angles to the object beam 28 and first passes through a variable filter 34 which enables the operator to adjust the intensity of this beam equal to the intensity of the object beam at their zone of convergence as will be hereinafter discussed. After leaving the variable filter 34, the reference beam passes through a second spatial filter 36 and continues thence as an expanding cone of laser light which is reflected by a third reflector 38 to cover a well known holographic transparency plate 40.

Arrows 42 generally indicate acoustical energy of selected intensity and wave length being directed toward the perforate surface 12 of the test specimen. The acoustical energy is generated by sound generator of a type well known in the art and is not shown for ease of illustration.

OPERATION

The operation of the illustrated testing apparatus A for practicing the invention is as follows:

The laser source 16 is energized with a suitable input power source so as to produce beam 18, which the shutter 20 regulates to selected intensity. The beam is divided by the splitter 26 into the two beams, the object beam 28 and the reference beam 32. The object beam 28, after passing through the spatial filter 30 and emerging as a diverging cone, illuminates the imperforate surface 14 of test specimen 10. Reference beam 32, after regulation by the variable filter and emerging from the spatial filter 36 as a diverging cone, is directed to the holographic transparency 40. Variable filter 34 is adjusted by the operator so that the intensity of the reference beam is balanced with the intensity of the object beam illumination of the imperforate surface where they are superimposed on plate 40.

Acoustical energy generally shown as 42, at the sonic designed resonant frequency of the cells of test sample A, or a harmonic thereof, and at selected intensity, is directed to the perforated surface 12 of test specimen 10 and a time-average hologram transparency is then made of the interference pattern generally shown by arrows 44 on imperforate sheet 14.

After the plate 40 is developed and reinstalled in its holding means, the acoustical energy is removed and the object beam 28 is extinguished. The reference beam 32 is then energized and the transparency is viewed by an observer through the transparent plate. Where cell resonance occurred during the initial exposure, light swirl areas will be seen indicating resonant or functioning cell structure while, in areas of non-resonating or malfunctioning cell structure, dark areas will be seen.

Field testing of the material can be performed in a similar manner by making a time average hologram of actual structure with the acoustical energy supplied by the environmental sound for which the cells of the material being tested are designed to be resonant.

In some instances, when acoustical honeycomb material is to be tested and its designed resonant frequency is unknown, rather than spend a considerable length of time determining the approximate resonant frequency by physical measurement of the cells and accompanying mathematical calculations, a real time image holographic transparency can be utilized. For this method, a transparency is first made with acoustical energy absent. The test material is then viewed through this transparency 40 while subjecting the perforated surface of the test material to acoustical energy at a selected intensity while slowly varying the sonic frequency over a selected range until light swirls of resonance occur. With the resonant frequency thus determined, the material can now be tested as hereinbefore described.

What is claimed as new and useful and desired to be secured by U.S. Letters Patent is:

1. Method of using holographic techniques for nondestructive testing of the sonic energy absorption qualities of acoustical honeycomb panel material with one perforate surface and one imperforate surface sandwiching a core with a plurality of cells designed to absorb a selected sonic frequency, comprising:

subjecting said cells through the openings in the perforate surface of the material to be tested with sonic acoustical energy of a selected frequency and intensity, making a time average holographic transparency of the imperforate surface and of said material while so excited, and viewing the resulting holographic transparency for determining dark areas of cell sonic acoustical energy non-absorption and light swirl areas indicating sonic acoustical energy absorption.

2. The method of claim 1, including preliminarily determining the acoustical absorption frequency of the cells when said absorption frequency is unknown, comprising the steps of:

making a real time holographic transparency of the non-perforated surface absent acoustical excitation, illuminating the non-perforated surface with laser light, and, subjecting said cells through the perforated surface of the material with acoustical energy at a suitable level of intensity while slowing varying the sonic frequencies until the light swirls of absorption appear.

* * * * *